Aug. 10, 1943.  R. P. KROON  2,326,145
TURBINE BLADE FASTENING
Filed March 18, 1941  2 Sheets-Sheet 1

INVENTOR
REINOUT P. KROON.

Aug. 10, 1943.   R. P. KROON   2,326,145
TURBINE BLADE FASTENING
Filed March 18, 1941   2 Sheets-Sheet 2

WITNESSES:
James K. Mosser
E. H. Litz

INVENTOR
REINOUT P. KROON.
BY
A. B. Rennie
ATTORNEY

Patented Aug. 10, 1943

2,326,145

UNITED STATES PATENT OFFICE 2,326,145

TURBINE BLADE FASTENING

Reinout P. Kroon, Swarthmore, Pa., assignor to Westinghouse Electric & Manufacturing Company, East Pittsburgh, Pa., a corporation of Pennsylvania Application March 18, 1941, Serial No. 383,995

6 Claims. (Cl. 253—77)

This invention relates to turbine blading and it has for an object to provide blading and its means of attachment constructed and arranged to facilitate the design, manufacture and mounting of blades so as to avoid vibration difficulties resulting in possible blade breakage.

In the design of turbine blades, it is important to predict accurately the natural frequency of the blades. In most designs, the degree of tightness with which the blade is held to the rotor may vary considerably. More variation in natural frequency is to be expected if the blades in themselves are made stiffer, and this is especially true where a plurality of blades are made integral with root and shroud portions.

It is a more particular object of the invention to provide a segmental blade unit or group in which the amount of variation in natural frequency is substantially minimized by having the root portion of the group held to the rotor by means of a pair of opposed pins.

With duplex blades or blades formed as segmental groups, each comprised by two or more blades attached to root and shroud portions, it has been found that the usual T-head root fastening may not exert its holding function in a distributed and uniform manner throughout the arcuate extent thereof. On the other hand, stresses may be concentrated or localized and there may be considerable variation in the degree of tightness resulting in variation in natural frequency. It is found that, if a plain root is used and held in place by a pair of opposed pins, variation in natural frequency can be minimized; and, in consequence, the natural frequency may be more accurately predicted with the result that the design of blade to avoid undesired blade conditions, such as a resonant condition related to a given speed, may be avoided.

While pin fastenings for independent blades are old in the art, so far as I am aware, they have been staggered or offset so as to avoid openings or grooves in a single root and at the same radius at opposite sides of the root with consequent reduction in strength and section of the root. On the other hand, with blades formed as elements of a segmental group or unit, the root portion thereof has such arcuate extent that very large openings may be formed therein for transverse holding pins without sacrifice in needed strength of the root portion.

Accordingly, a further and more particular object of the invention is to provide a segmental blade unit or group comprising root and shroud portions joined by two or more blades and wherein the blade unit or group is attached to the rotor by means of two transverse pins extending through openings provided in or near to the end faces of root portion of the group.

These and other objects are effected by the invention as will be apparent from the following description and claims taken in connection with the accompanying drawings, forming a part of this application, in which:

Figure 1:
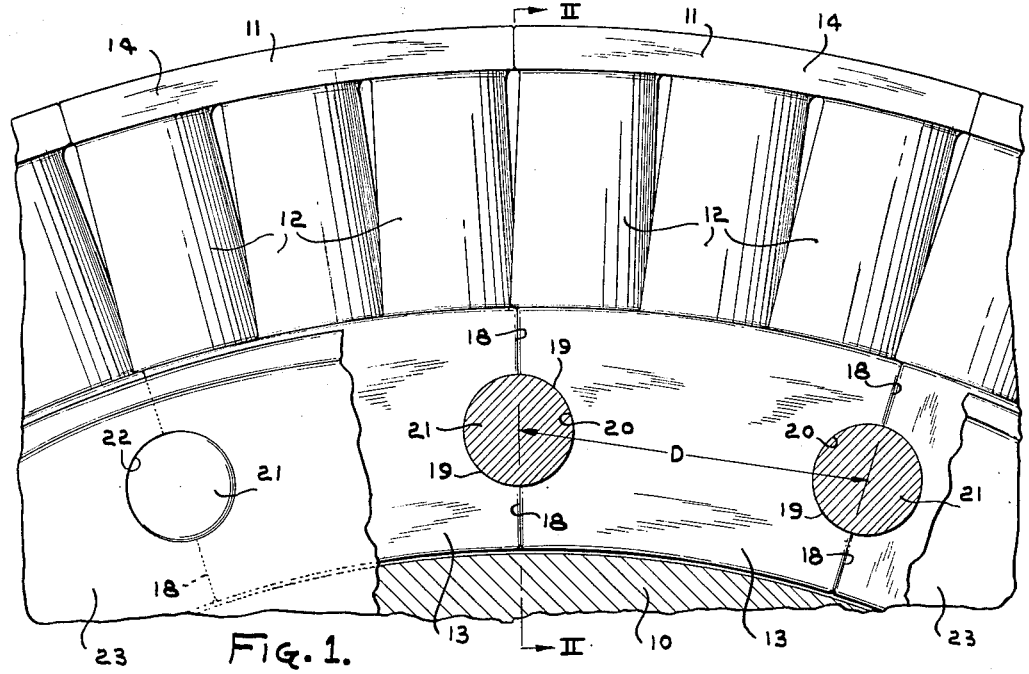
Fig. 1 is a view showing a turbine rotor equipped with the improved blade units or groups, the root portion of one of the roots or groups being shown in section.

In the drawings, the rotor 10 carries a circumferential series of segmental blade units or groups, at 11, providing a row of blades 12. Each segmental blade unit or group, at 11, comprises two or more blades 12 with a root portion 13 and a shroud portion 14.

The rotor is provided with a blade groove 15, preferably having flat parallel side walls 16 and the root portions 13 have flat parallel side faces 17 fitting the side walls and contiguous end faces 18. Thus, the root portions are disposed in the groove in an annular formation with the end faces 18 of each root portion disposed adjacent to opposed end faces of the adjacent root portions.

Figure 4:
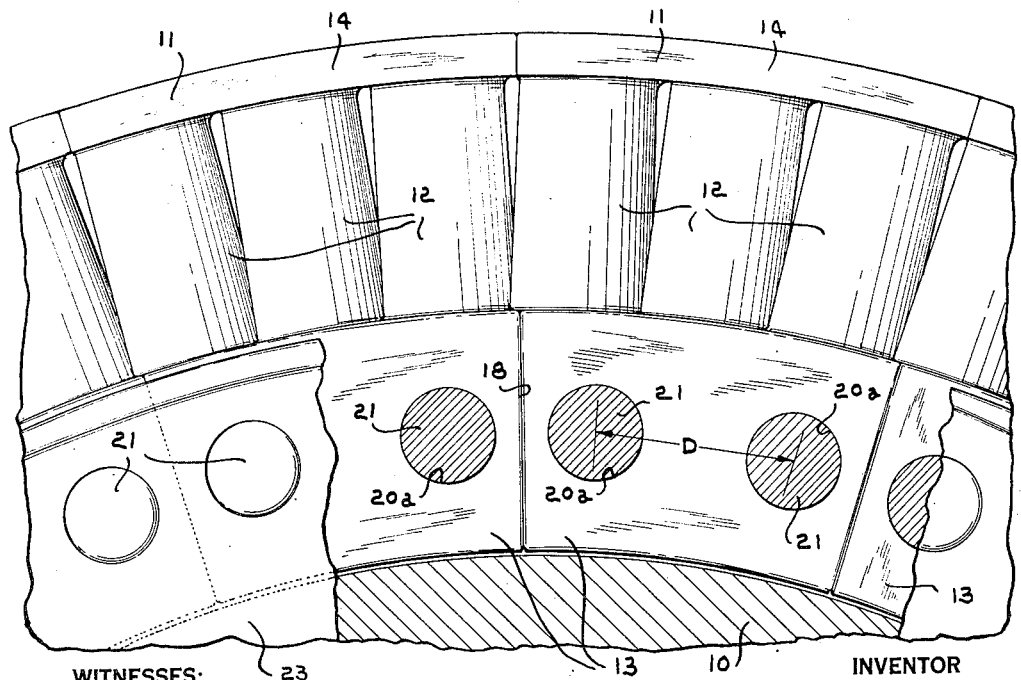
Fig. 4 shows a further modified form of blade unit or group.

The arcuate extent of each root portion 13 corresponds to that of the blade unit or group so that the end faces 18 of each root portion converge inwardly and are located in planes radiating from the rotor axis. In Fig. 1, each end face 18 is formed with a groove 19 extending transversely thereof, and, when the units or groups are assembled in the blade groove 15, the grooves 19 of adjacent end faces 18 complementally form openings 20 for the reception of pins 21 fitting openings 22 formed in the rotor flanges 23 at opposite sides of the groove. In Fig. 4, instead of the pin openings 20a being formed in the end faces 18, they are formed within the root and near thereto.

With this arrangement, it will be apparent that the distance D between opposed pins of each root portion is so large that, even without a tight fit around the pins, the reactions from centrifugal force on the segmental unit or group prevent any rocking in a circumferential direction.

Thus, aside from independent variations in manufacturing or differences in expansion of the blading and the rotor, the segmental unit or group will be held at the pins and frequency can be calculated on this basis with greater accuracy. Furthermore, each segmental group or unit root portion inherently is so dimensioned that relatively large grooves may be formed in opposite end faces of each root portion without sacrifice in needed strength thereof.

Figure 2:
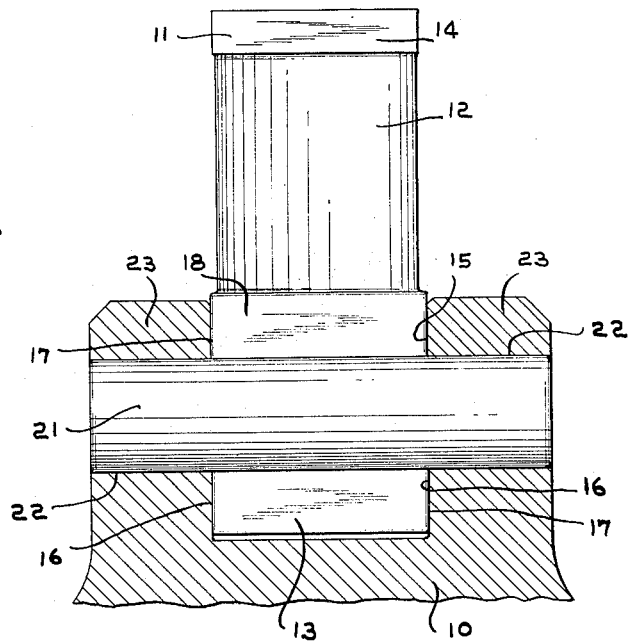
Fig. 2 is a sectional view taken along the line II—II of Fig. 1.
Figure 3:
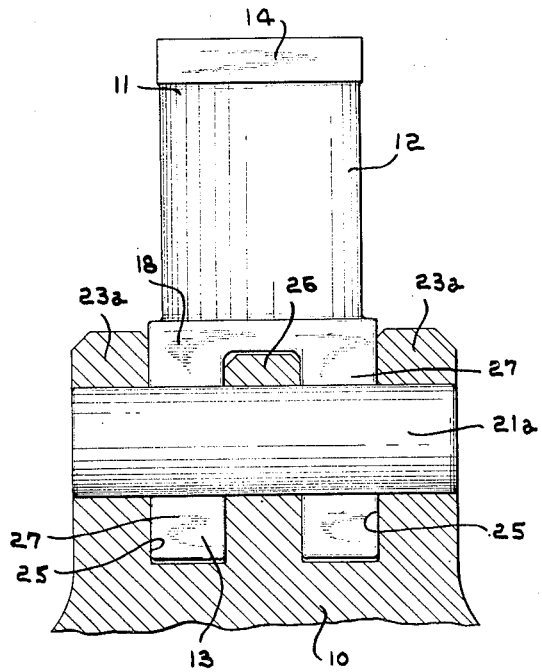
Fig. 3 is a view similar to Fig. 2 but showing a modified form of root and rotor connection.

In Fig. 3, there is shown an embodiment of the invention which is generally the same in principle and construction as that already described except that, instead of the rotor having a single groove, as in Fig. 1 and Fig. 2, it has a double groove wherein the groove portions 25 are separated by an annular tongue portion 26, the root portions of the segmental units or groups being bifurcated to provide arcuately-extending tongues 27 disposed in the groove portions 25. The tongues 27 may be fastened to the rotor by pins 21a arranged with respect to the root portion either in the way shown in Fig. 1 or that shown in Fig. 4. As the pins 21a pass through openings formed in the outer rotor flange portions 23a and the intermediate flange portion 26, each pin will have twice the shear area for the same size as that shown in Figs. 1 and 2.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In a turbine, a rotor having radial flanges provided with opposed and smooth faces defining a blade groove, a circumferential series of blade groups, each blade group including a plurality of blades and a unitary root portion integral with the inner ends of the latter, the root portions being disposed circumferentially in end-to-end relation in the groove and having smooth side faces arranged contiguously to said flange faces, each root portion having only one pair of openings formed therein with the openings located at the end face regions thereof, said flanges having openings formed therein and aligned with the root portion openings, the aligned openings extending transversely of the flanges and of the groove and being arranged substantially parallel to the rotor axis, and pins extending through the aligned openings and serving to fasten the root portions to the flanges.

2. In an elastic-fluid turbine, a circumferential series of segmental blade groups providing a row of blades, each blade group comprising a plurality of blades and a unitary root formed integral therewith, each root having end faces and having only one pair of transverse openings formed therein with one opening located at each end face region thereof, a rotor having a blade groove and the roots being disposed circumferentially in end-to-end relation in the latter, and pins carried by the rotor and extending through said openings to fasten the roots to the rotor.

3. In an elastic-fluid turbine, a rotor, a circumferential series of blade groups providing a row of blades, each blade group comprising a plurality of blades and a unitary root portion formed integrally therewith, each root portion having flat side and end faces and provided with only one pair of transverse openings with one opening located at each end face region thereof, said rotor having a blade groove and the root portions being disposed therein, and pins carried by the rotor and extending through said openings to fasten the root portions to the rotor.

4. In an elastic-fluid turbine, a rotor, a circumferential series of blade groups providing a row of blades, each blade group comprising a plurality of blades and a unitary root portion integral therewith, each root portion having end faces which converge inwardly in relation to the groups and each end face having only one transverse groove formed therein, said rotor having a blade groove and the root portions being disposed therein with their end faces adjoining and with the transverse grooves complementally forming pin openings, and pins carried by the rotor and extending through said openings to fasten the root portions to the rotor.

5. In an elastic-fluid turbine, a rotor, a circumferential series of segmental blade groups providing a row of blades, each blade group comprising a plurality of blades and a unitary root portion integral therewith, each root portion having end faces and flat side faces and each end face having only one transverse groove formed therein, said rotor having a blade groove provided with flat side walls and the root portions being disposed therein in annular formation with the side faces contiguous to the blade groove side walls and with their end faces in contiguous relation so that the transverse grooves thereof complementally form pin openings, and pins carried by the rotor and extending through said openings to fasten the root portions to the rotor.

6. In an elastic-fluid turbine, a circumferential series of segmental blade groups providing a row of blades, each blade group comprising a plurality of blades and a unitary root portion integral therewith, each root portion having end faces which converge inwardly in relation to the group and each end face having only one transverse groove formed therein, said rotor having a blade groove and the root portions being disposed therein in annular formation with the end faces extending radially of the rotor and in contiguous relation so that the transverse grooves complementally form pin openings, and pins carried by the rotor and extending through said openings to fasten the root portions to the rotor.

REINOUT P. KROON.